United States Patent
Menendez Gonzalez et al.

(10) Patent No.: US 10,669,384 B2
(45) Date of Patent: Jun. 2, 2020

(54) SUPERCRITICAL CO2 CELLULOSE SPRAYDRYING

(71) Applicant: SAPPI Netherlands Services B.V., Maastricht (NL)

(72) Inventors: Reyes Menendez Gonzalez, Amsterdam (NL); Daniela Oana Trambitas, The Hague (NL); Seda Cantekin, Maastricht (NL); Ian Graveson, Nuneaton (GB); Math Jennekens, Simpelveld (NL); Saschi Momin, London (GB)

(73) Assignee: SAPPI Netherlands Services B.V., Maastricht (NL)

( * ) Notice: Subject to any disclaimer, the term of this patent is extended or adjusted under 35 U.S.C. 154(b) by 0 days.

(21) Appl. No.: 15/762,901

(22) PCT Filed: Sep. 26, 2016

(86) PCT No.: PCT/EP2016/072826
§ 371 (c)(1),
(2) Date: Mar. 23, 2018

(87) PCT Pub. No.: WO2017/051030
PCT Pub. Date: Mar. 30, 2017

(65) Prior Publication Data
US 2018/0282490 A1   Oct. 4, 2018

(30) Foreign Application Priority Data
Sep. 25, 2015   (EP) .................................... 15186998

(51) Int. Cl.
*C08J 3/12*   (2006.01)
*B01D 1/18*   (2006.01)
(Continued)

(52) U.S. Cl.
CPC ................ *C08J 3/122* (2013.01); *B01D 1/18* (2013.01); *B01D 11/0203* (2013.01); *C08J 3/03* (2013.01);
(Continued)

(58) Field of Classification Search
None
See application file for complete search history.

(56) References Cited

U.S. PATENT DOCUMENTS

| 4,481,076 A | 11/1984 | Herrick |
| 2011/0260348 A1 | 10/2011 | Gardner et al. |

FOREIGN PATENT DOCUMENTS

| EP | 0 120 471 A2 | 10/1984 |
| EP | 2 623 545 A1 | 8/2013 |

(Continued)

OTHER PUBLICATIONS

Biyani et al, Light-Healable Supramolecular Nanocomposites Based on Modified Cellulose Nanocrystals, ACS Macroletters, 2, pp. 236-240 (Year: 2013).*

(Continued)

*Primary Examiner* — Stefanie J Cohen
(74) *Attorney, Agent, or Firm* — Sughrue Mion, PLLC

(57) ABSTRACT

The present invention provides for a process for producing dry, water-dispersible, non-surface modified nanocellulose particles or a powderous composition r comprising said particles comprising the steps of:
i. providing a first suspension of non-surface modified cellulose particles in an first aqueous liquid, which aqueous liquid is non-solubilizing for the non-surface modified nanocellulose particles,
ii. exchanging substantially all of the first aqueous liquid of the first suspension for a second solvent, which is miscible with the first aqueous liquid and non-solubilizing for the
(Continued)

non-surface modified nanocellulose particles, to form a second suspension of non-surface modified nanocellulose particles in said second solvent, iii. contacting a flow of the second suspension of non-surface modified nanocellulose particles with a flow of a fluid in a supercritical or critical state, which fluid in a supercritical or critical state is miscible with the second solvent and non-solvating for the non-surface modified nanocellulose particles under conditions suitable for the transfer of substantially all of the second solvent into the supercritical fluid, iv. removing the second solvent and the fluid in a supercritical or critical state, preferably by controlling pressure and/or temperature, to form the dry, water-dispersible nanocellulose particles, v. collecting the dry, water-dispersible, non-surface modified nanocellulose particles and/or forming the powderous composition comprising said particles.

20 Claims, 4 Drawing Sheets

(51) Int. Cl.
D21C 9/00 (2006.01)
F26B 3/12 (2006.01)
D21H 11/18 (2006.01)
B01D 11/02 (2006.01)
C08J 3/03 (2006.01)
C08J 3/09 (2006.01)
B82Y 40/00 (2011.01)

(52) U.S. Cl.
CPC .............. C08J 3/095 (2013.01); C08J 3/096 (2013.01); D21C 9/004 (2013.01); D21C 9/005 (2013.01); D21C 9/007 (2013.01); D21H 11/18 (2013.01); F26B 3/12 (2013.01); B82Y 40/00 (2013.01); C08J 2301/02 (2013.01); Y02P 20/544 (2015.11)

(56) References Cited

FOREIGN PATENT DOCUMENTS

| WO | 2010/014011 A1 | 2/2010 |
| WO | 2011/030170 A1 | 3/2011 |
| WO | 2011/095335 A1 | 8/2011 |
| WO | 2012/107642 A1 | 8/2012 |
| WO | 2014/009517 A1 | 1/2014 |
| WO | 2014/087053 A1 | 6/2014 |

OTHER PUBLICATIONS

Peng et al, Influence of drying method on the material properties of nanocellulose I: thermostability and crystallinity, cellulose, https://www.fpl.fs.fed.us/documnts/pdf2013/fpl_2013_peng005.pdf (Year: 2013).*

Sehaqi et al, Strong and Tough Cellulose Nanopaper with High Specific Surface Area and Porosity, Biomacromolecules, 12, pp. 3638-3644 (Year: 2011).*

Yucheng Peng et al., "Drying cellulose nanofibrils: in search of a suitable method," Cellulose, Dec. 2012, pp. 91-102, vol. 19, No. 1.

Yucheng Peng et al., "Influence of drying method on the material properties of nanocellulose I: thermostability and crystallinity," Cellulose, 2013, pp. 2379-2392, vol. 20.

Ernesto Reverchon, "Supercritical antisolvent precipitation of micro- and nano-particles," Journal of Supercritical Fluids, May 1999, pp. 1-21, vol. 15, No. 1.

Ryuji Shinoda et al., "Relationship between Length and Degree of Polymerization of TEMPO-Oxidized Cellulose Nanofibrils," Biomacromolecules, Mar. 12, 2012, pp. 842-849, vol. 13, No. 3.

"Water Activity (aw) in Foods," Inspection Technical Guides, Apr. 16, 1984, 4 pgs.

Evelyn Fairman, "Avoiding Aggregation During Drying and Rehydration of Nanocellulose," The University of Maine Honors College, May 2014, 60 pgs., Paper 172.

International Search Report for PCT/EP2016/072826, dated Nov. 23, 2016 (PCT/ISA/210).

Written Opinion of the International Searching Authority, dated Nov. 23, 2016 (PCT/ISA/210).

Harald F. Krug et al., "Nanopartikel", ROMPP Online, Version 3.37, Jun. 1, 2011, XP055092623, Retrieved from the Internet: <URL:https://roempp.thieme.de/roempp4.0/do/data/RD-14-02250> (3 pages total).

* cited by examiner

SUPERCRITICAL CO2 CELLULOSE SPRAYDRYING

TECHNICAL FIELD

The present invention relates to a process for producing dry, water-dispersible nanocellulose particles.

PRIOR ART

Nanocellulose is a promising material which has recently benefited from increased scrutiny in the industry. Two main production processes exist for obtaining nanocellulose; the first being based on milling and fluidization in aqueous fluids, where nanocellulose is obtained from a process which is based on the traditional pulping process. This process usually results in a diluted aqueous dispersion containing a certain amount of nanocellulose in aqueous liquid. Such dilute dispersions are not of much interest in an industrial context, and thus evaporation of the liquid to produce a more convenient dry powder of nanocellulose is desirable. However, it has been found that upon evaporation of the aqueous liquid through heating, microscopic agglomerates of nanofibrils are formed in the obtained nanocellulose powder, which cannot be re-dispersed in an aqueous liquid without considerable effort. The formation of these non-dispersible agglomerates in the nanocellulose powder thus obtained is thought to be the main reason for the loss of some of the desirable mechanical properties (such as viscosity and elasticity) of the thus obtained, reconstituted, nanocellulose, in comparison to never dried nanocellulose.

These disadvantages strongly impede the more widespread use of nanocellulose, since dilute dispersions cannot be transported in an acceptable manner and less-than optimal mechanical properties make the nanocellulose powders less attractive for example as reinforcing agent in polymers. In fact, most nanocellulose which is nowadays freshly produced ad hoc and used in the form of a dispersion or a gel in an aqueous liquid, without ever having been dried and re-hydrated.

Therefore, it is highly desirable to provide a dry, convenient form of nanocellulose which can easily be stored and transported and re-dispersed in water or other aqueous liquids and which can be manufactured easily and cost effectively as well as in a continuous manner at an industrial scale, preferably using slightly modified pre-existing industrial infrastructure and that can be used preferably immediately downstream of existing the production processes of nanocellulose.

The publication "supercritical CO2 spray drying of ethyl cellulose (EC) for preparing microparticles" discloses a process in which a chemically derived cellulose, namely ethyl cellulose, is processed into micro particles by first preparing a solution of ethyl cellulose and acetone and providing supercritical carbon dioxide, which are both then combined by jointly spraying them into a precipitation chamber where the ethyl cellulose and acetone solution and supercritical carbon dioxide exchange the acetone solvent inside the ethyl cellulose droplets towards the supercritical carbon dioxide, resulting in dried ethyl cellulose droplets that can be collected. However, this publication does not describe the supercritical carbon dioxide spray drying of unmodified cellulose, let alone of unmodified nanocellulose. Also, a solution of ethyl cellulose and acetone (as opposed to a dispersion or suspension) is used, which means that the ethyl cellulose is solubilized in the acetone, resulting in the complete disruption of the intra-molecular bonds that are responsible for the crystallinity of nanocellulose domains. Therefore, the process described is inherently unsuitable for the preparation of the desired powder of unmodified nanocellulose.

European patent application EP 2 623 545 A1 circumvents the problems of providing a dried, powdered nanocellulose which is re-dispersible in a fluid by directly performing the fibrillation process in a polymer resin to create a master batch resin composition which can be further used to produce polymer composites filled with nanocellulose particles. Fibrillation of the cellulose is performed by adding the precursor cellulose into a polyester based resin and applying a shearing force mechanically until a certain degree of fibrillation is achieved.

WO 2014/087053 A1 discloses a process through which nanocellulose composites of nanocellulose and polymer resin can be obtained. The method comprises the steps of milling in a pearl mill a nanocellulose feedstock in a liquid phase to produce a dispersion containing nanocellulose. The liquid phase of the dispersion is formed by a precursor monomer of a thermoset resin. Thus, also here the problem of having to dry nanocellulose into a re-dispersible powder is circumvented by milling a nanocellulose feedstock in the cross-linkable precursor monomer of a polymer and adding a cross-linker to the dispersion once a certain degree of fibrillation is achieved.

WO 2012/107642 A1 relates to a method for processing an aqueous gel of nanofibrillar cellulose by removing water from the aqueous gel by means of an organic solvent miscible with water comprising the steps of introducing an aqueous gel into a volume of organic solvent miscible with water in a controlled manner so that the aqueous gel is kept as a separate phase and forms discrete physical entities containing the nanofibrillar cellulose within the phase, exchanging the water for an organic solvent in said discrete physical entities of nanofibrillar cellulose and separating the physical entities of thus obtained organogel from the volume of organic solvent. The thus obtained organogel is then dried through conventional drying processes such as heating or vacuum.

WO2011/030170 A1 discloses a process for obtaining an aerogel of cellulose nanoparticles by first preparing a hydrogel of cellulose nanoparticles in pure water, exchanging the water in the hydrogel for a solvent in order to obtain an organogel of cellulose nanoparticles and subsequently removing the solvent of the organogel by placing a molded organogel ingot in a flow of supercritical $CO_2$ at 100 bar and 40° C. in order to yield an aerogel ingot. However, the obtained aerogel ingots may not be used, for example as reinforcing agent without prior grinding into particles.

WO2011/095335 A1 describes the CNF drying by means of liquid CO2.

"In search of a sustainable method", *Cellulose*, Peng Y., et al., 2012, 19(1), p. 91-102), four different methods are considered for CNF drying describing the supercritical method as a four step batch process in which the suspended cellulose in aqueous solution was first washed with 4 ethanolic solutions which were used for solvent exchange of the aqueous phase. The suspended cellulosic fibers in ethanol were mixed under pressure with liquid CO2 to remove the ethanol and then the temperature and pressure were increased up to supercritical conditions in order to achieve the final drying. The resulting dry samples presented a lot of agglomerates that were hardly dispersible.

The supercritical drying using C1-C4 alcohols is described in the WO2010014011 A1 (PCT/NL2009/050475).

SUMMARY OF THE INVENTION

The present invention provides for 0) a process for producing non-surface modified nanocellulose particles or a powder comprising said particles comprising the steps of:
i. providing a first suspension of non-surface modified cellulose particles in an first aqueous liquid, which aqueous liquid is non-solubilizing for the non-surface modified nanocellulose particles,
ii. exchanging substantially all of the first aqueous liquid of the first suspension for a second solvent, which is miscible with the first aqueous liquid and non-solubilizing for the non-surface modified nanocellulose particles, to form a second suspension of non-surface modified nanocellulose particles in said second solvent,
iii. contacting a flow of the second suspension of non-surface modified nanocellulose particles with a flow of a fluid in a supercritical or critical state, which fluid in a supercritical or critical state is miscible with the second solvent and non-solvating for the non-surface modified nanocellulose particles under conditions suitable for the transfer of substantially all of the second solvent into the supercritical fluid,
iv. removing the second solvent and the fluid in a supercritical or critical state, preferably by controlling pressure and/or temperature, to form the dry, water-dispersible nanocellulose particles,
v. collecting the non-surface modified nanocellulose particles and/or forming the powderous composition comprising said particles.

The present invention provides for I) a process for producing dry, water-dispersible, non-surface modified nanocellulose particles or a powder comprising said particles comprising the steps of:
i. providing a first suspension of non-surface modified cellulose particles in an first aqueous liquid, which aqueous liquid is non-solubilizing for the non-surface modified nanocellulose particles,
ii. exchanging substantially all of the first aqueous liquid of the first suspension for a second solvent, which is miscible with the first aqueous liquid and non-solubilizing for the non-surface modified nanocellulose particles, to form a second suspension of non-surface modified nanocellulose particles in said second solvent,
iii. contacting a flow of the second suspension of non-surface modified nanocellulose particles with a flow of a fluid in a supercritical or critical state, which fluid in a supercritical or critical state is miscible with the second solvent and non-solvating for the non-surface modified nanocellulose particles under conditions suitable for the transfer of substantially all of the second solvent into the supercritical fluid,
iv. removing the second solvent and the fluid in a supercritical or critical state, preferably by controlling pressure and/or temperature, to form the dry, water-dispersible nanocellulose particles,
v. collecting the dry, water-dispersible, non-surface modified nanocellulose particles and/or forming the powderous composition comprising said particles.

In an embodiment, the present invention further provides for II) a process according to 0) or I), wherein the first aqueous liquid is either water or a mixture of water and one or more organic solvents, where said organic solvents are preferably capable of acting as swelling agents, and preferably the first aqueous liquid is a mixture of water and a cyclic secondary amine comprising of from 60 to 99% (by volume) of cyclic amine, and more preferably is an mixture of water and morpholine, piperidine or both, and most preferably is a mixture of morpholine, piperidine or both comprising of from 60 to 99% (by volume) of morpholine, piperidine or both, or of from 70 to 95% (by volume) of morpholine or piperidine or both.

In an embodiment, the present invention further provides for III) a process according to 0) or I) or II), wherein the cellulose particles are nanocellulose particles, preferably cellulose nanofibers (CNF) or nanocrystalline cellulose (NCC).

In an embodiment, the present invention further provides for IV) a process according to 0) or I), II), or III) wherein the first suspension comprises up to 20 wt %, preferably of from 0.1 to 20 wt %, more preferably more than 2 wt % and less than 20 wt % of non-surface modified cellulose.

In an embodiment, the present invention further provides for V) a process according to 0) or I), II), III), or IV) wherein the mass flow ratio between the second suspension and the fluid in a supercritical or critical state is in the range of from 1:10000 to 3:10 preferably in the range 3:10000 to 3:10.

In an embodiment, the present invention further provides for VI) a process according to 0) or I), II), III), IV) or V) wherein in step c. the second suspension and the fluid in a supercritical or critical state are contacted either
i. by simultaneously atomizing the flow of the second suspension of non-surface modified nanocellulose particles and the flow of the fluid in a supercritical or critical state separately through one or more, preferably concentric or coaxial, nozzles into a pressure- and/or temperature-controlled particle formation vessel, or
ii. by blending, swirling, vortexing or otherwise mixing the flow of the second suspension and the flow of the fluid in a supercritical or critical state to form a mixture and atomizing said mixture across one or more nozzles, into a pressure- and/or temperature-controlled particle formation vessel.

In an embodiment, the present invention further provides for VII) a process according to VI), wherein in step i. the second suspension and the fluid in a supercritical or critical state are contacted by simultaneously atomizing the flow of the second suspension of non-surface modified nanocellulose particles and the flow of the fluid in a supercritical or critical state jointly or separately through one or more, preferably concentric or coaxial, nozzles into a pressure- and/or temperature-controlled particle formation vessel. The one or more nozzles may be equipped with an internal mixing domain in which the two flows are combined before being jointly atomized into the particle formation vessel or at least two nozzles may be positioned such that the two flows are combined after being separately atomized into the particle formation vessel. In both cases, nozzles, and in particular concentric or coaxial ones, having a diameter ratio D1/D2 in the range of 0.7 to 0.9, where D1 corresponds to the diameter of the nozzle carrying the flow of the second suspension of non-surface modified nanocellulose particles and D2 corresponds to the diameter of the nozzle carrying the fluid in a supercritical or critical state, were found to be particularly advantageous.

In an embodiment, the present invention further provides for VIII) a process according to 0) or I), II), III), IV), V), or VI) in the case of step c. being as defined in i., the second suspension is flown through the central jet of the concentric or coaxial nozzle and the fluid in a supercritical state is flown through the annular peripheral jet.

In an embodiment, the present invention further provides for IX) a process according to 0) or I), II), III), IV), V), VI), VII) or VIII) wherein the second solvent is chosen from organic solvents, preferably polar solvents such as alcohols, aldehydes, ketones, or oxides, more preferably from alcohols such as C1-C6 alkanols like for example ethanol, n-propanol, iso-propanol, n-butanol, iso-butanol, hexanol; or such as C2-C4 alkanediols such as for example ethane-1,2-diol (ethylene glycol), propane-1,2-diol or propane-1,3-diol; or such as cycloalkanols such as for example cyclohexanol; or such as from C1-C4 ketones such as acetone; or combinations thereof.

The present invention also provides for X) a powder of dry, water-dispersible nanocellulose particles, preferably of dry, water-dispersible nanocellulose particles essentially consisting of cellulose nanofibers (CNF), nanocrystalline cellulose (NCC), or mixtures thereof, where the dry, water-dispersible, non-surface modified nanocellulose particles preferably have a water activity $a_w$ of less than 0.4 or 0.01 and 0.4, and more preferably between 0.2 and 0.4, in particular when measured at room temperature.

In an embodiment of X), the particles comprised in the powder have a diameter in the range of 3-200 nm and/or have an average length in the range of 10-1200 nm. The particles may be essentially spherical or elongated in shape.

The present invention additionally provides for XI) a powder of dry, water-dispersible nanocellulose particles obtained according to the process described in any of I), II), III), IV), V), VI), or VII), which preferably has a mesoporous or macroporous structure having a pore size in the range of 2 to 500 nm, or in the range of 2 to 50 nm or 50 nm to 500 nm, respectively, and/or in which the fibril diameter is in the range of 4 to 200 nm, and/or the typical powder particle size $d_{50}$ is inferior to 75 µm.

The present invention also provides XII) non-surface modified nanocellulose particles, obtainable by a process according to 0) to IX), preferably essentially consisting of cellulose nanofibers (CNF), nanocrystalline cellulose (NCC), or mixtures thereof, more preferably having a water activity $a_w$ of less than 0.4 or 0.01 and 0.4, and more preferably between 0.2 and 0.4, in particular when measured at room temperature.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
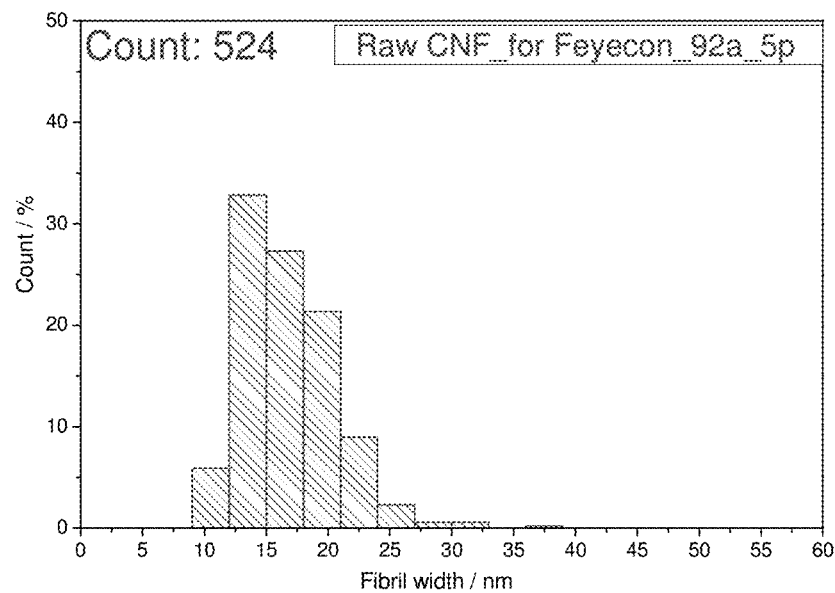
FIG. 1 shows the fibril width distribution of non-surface modified, never-dried nanofibrillar cellulose as measured by image analysis of SEM micrographs

The term "nanocellulose" as used herein encompasses the (interchangeably used) term "nanofibrillated cellulose" or "CNF" or "cellulose nanofibrils" or "CNF" and refers to cellulose nanoparticles which are characterized by having a spherical or elongated form. The average diameter is preferably in the range of 3-200 nm, preferably in the range of 5-100 nm, more preferably in the range of 5-30 nm, and in the case they are of elongated shape, the aspect ratio is of >1, preferably of >5, and further have the aforementioned diameter and an average length in the range of 10-1200 nm, preferably in the range of 50-700 nm, more preferably 70-700 nm.

The term "dry" as used herein means essentially free of liquid, in particular water, under atmospheric conditions (1 atm., 25° C.), preferably of less than 5 wt %, more preferably of less than 2 wt % of liquid and in particular of water.

Preferably, the term "water-dispersible" as used herein means forming a suspension in water and where at least 70%, and preferably at least 75%, more preferably at least 85% recovery of the elastic modulus measured at 10 rad s$^{-1}$; or alternatively at least 70%, preferably at least 75%, more preferably at least 85%, recovery of the viscous modulus measured at a shear rate of 10 rad s$^{-1}$; or alternatively at least 80%, preferably at least 90% recovery of the nanocellulose phase height of an aqueous dispersion at 0.4 wt % of solids; can be achieved when compared to never-dried nanocellulose.

The first suspension of non-surface modified nanocellulose particles in a first aqueous liquid can be obtained by suspending non-surface modified cellulose particles in a first aqueous liquid and refining the non-surface modified cellulose particles of the suspension until non-surface modified nanocellulose particles are formed within the suspension.

The non-surface modified cellulose particles from which non-surface modified cellulose particles can be sourced primarily from wood pulp, other cellulosic biomass fibres and commercially available micro-crystalline cellulose, such as for example Avicel PH-101 from FMC Corporation. Wood pulp includes ground wood fibres, recycled or secondary wood pulp fibres, bleached and unbleached wood fibres. Both softwood and hardwood can be utilized for the wood pulp. In addition, suitable cellulosic biomass materials such as bagasse, flax, switchgrass, bamboo, cotton, hemp or sisal can be utilized for making pulp. Another exemplary wood pulp is bleached dissolving hardwood pulp (92a) pulp.

Refining the non-surface modified cellulose particles of the suspension can be facilitated if the first aqueous liquid is a mixture of water and one or more chemical components capable of acting as swelling agents that weaken the inter-crystalline bonds of the cellulose but without weakening the intra-crystalline bonds of the cellulose. In this case, the non-surface modified cellulose particles are preferably left to swell in the first aqueous liquid comprising a mixture of water and one or more swelling agents for a predetermined time, for example from 1, 6 or 24 hours or any intermediate amount of time, and optionally under agitation.

The swollen or non-swollen, non-surface modified fibrous cellulose particles suspended in the first aqueous liquid are subjected to mechanical comminution using conventional technologies known in the art, imparting high shear forces, such as microfluidization, (e.g. a M110-EH Microfluidizer Processor fitted with two chambers in series), high pressure homogenization (e.g. a NanoDeBee high pressure homogenizer (BEE International Inc), a ConCor high pressure/high shear homogenizer (Primary Dispersions Ltd)), or imoparting high friction forces (e.g. a Super MassColloider colloid/friction mill (Masuko)), and/or combinations thereof.

During the mechanical comminution of the suspension of non-surface modified cellulose particles, the cellulose particles are broken down into the desired non-surface modified nanocellulose particles and the first suspension of non-surface modified nanocellulose particles in a first aqueous liquid is formed.

Alternatively, suspensions of non-surface modified nanocellulose particles in a aqueous liquids are available commercially.

The first aqueous liquid must be non-solubilising for the non-surface modified nanocellulose particles, so that the cellulose particles are not dissolved in the first aqueous liquid and a first suspension of undissolved nanocellulose particles is formed. The full dissolution of the cellulose would result in the destruction of the crystalline regions of the cellulose particles, which regions are thought to be responsible for the outstanding mechanical properties of cellulose nanofibers (CNF) and nanocrystalline cellulose (NCC).

The first aqueous liquid may be water or may be a mixture of water and one or more chemical components such as organic solvents, where said organic solvents are preferably at least partially soluble in water and where said organic solvents are preferably capable of acting as swelling agents, and preferably the first aqueous liquid is a mixture of water with morpholine, piperidine or both, and more preferably is a mixture of morpholine, piperidine or both comprising of from 60 to 99% (by volume) of morpholine, piperidine or both, or of from 70 to 95% (by volume) of morpholine or piperidine or both.

The first suspension of non-surface modified nanocellulose particles in a first aqueous liquid may have a cellulose content of 0.1 to 10 weight percent, preferably of 0.1 to 5 weight percent and more preferably of from 0.5 to 2.5 weight percent, said weight percent being based on the total weight of the first suspension.

After the first suspension of non-surface modified nanocellulose particles in a first aqueous liquid is formed, the first aqueous liquid of the first suspension must be exchanged for a second solvent, which is miscible with the first aqueous liquid and non-solubilising for the non-surface modified cellulose particles, to form a second suspension of non-surface modified cellulose particles in said second solvent.

This exchange may be performed by several methods, including a) draining the first suspension of non-surface modified nanocellulose particles in a first aqueous liquid to remove the majority of the first aqueous liquid and subsequently washing away the residual first aqueous liquid by repeated washing of the still wet non-surface modified nanocellulose particles with the second solvent until essentially all of the first aqueous liquid has been removed and the second suspension of non-surface modified cellulose particles in said second solvent is formed, or b) continuously washing the first suspension of non-surface modified nanocellulose particles in a first aqueous liquid with the second solvent until essentially all of the first aqueous liquid has been removed and the second suspension of non-surface modified cellulose particles in said second solvent is formed.

In the case of a), the exchange may for example be performed through batchwise centrifugal filtration, and in the case of b) the exchange may be performed through continuous centrifugal filtration. Other methods are known in the prior art.

The second solvent must be non-solubilising for the non-surface modified nanocellulose particles, so that the cellulose particles are not dissolved in the first aqueous liquid and a first suspension of undissolved nanocellulose particles is formed. The full dissolution of the cellulose would result in the destruction of the crystalline regions of the cellulose particles, which regions are thought to be responsible for the outstanding mechanical properties of cellulose nanofibers (CNF) and nanocrystalline cellulose (NCC).

The second solvent must at least partially be miscible with water and is preferably miscible with other components, such as the organic solvents, of the first aqueous liquid in order to facilitate the exchange and removal of essentially all of the first aqueous liquid from the first suspension of nanocellulose particles.

The second solvent is preferably one or more organic solvent, which is preferably different from the organic solvents eventually comprised in the first aqueous liquid and preferably at least partially miscible to water. A suitable second solvent is chosen from organic solvents, preferably polar solvents such as alcohols, aldehydes, ketones, acetonitrile, or oxides such as dioxane or THF, more preferably from alcohols such as C1-C6 alkanols like for example ethanol, n-propanol, iso-propanol, n-butanol, iso-butanol, hexanol, or such as C2-C4 alkanediols such as for example ethane-1,2-diol (ethylene glycol), propane-1,2-diol or propane-1,3-diol, or such as cycloalkanols such as for example cyclohexanol; or ketones such as from C1-C4 ketones such as for example acetone or acetaldehyde; or combinations of said alcohols and ketones.

When essentially all of the first aqueous liquid has been removed and replaced by the second solvent, the second suspension of non-surface modified cellulose particles in said second solvent is formed, which can then be further processed.

The second suspension of non-surface modified cellulose particles is the contacted with a flow of a fluid in a supercritical or critical state, which fluid in a supercritical or critical state is miscible with the second solvent and non-solvating for the non-surface modified cellulose particles under conditions suitable for the transfer of substantially all of the second solvent into the supercritical fluid.

As a next step, a flow of the second suspension of non-surface modified nanocellulose particles is contacted with a flow of a fluid in a supercritical or critical state in order to transfer all of the second solvent into the supercritical fluid. It is understood that for the transfer to be successful, the pressure and temperature conditions during the step of contacting the flows are set such that the fluid in a supercritical or critical state remains in the supercritical or critical state at least until the transfer has been effected.

A person skilled in the art will know which given pressure and temperature conditions are required to obtain a fluid in a supercritical or critical state.

As a general rule, a suitable pressure should be selected in the range of about 10 to about 300 bar, preferably in the range of about 15 to 250 bar, preferably in the range of about 73.9 to 150 bar, whereas the suitable temperature should be selected in the range of about 0 to about 100° C., more preferably in the range of about 25 to about 60° C. such as for example 30° C., 35° C., 40° C., or 45° C., more preferably in the range of about 31.1 to about 50° C.

To achieve the transfer all of the second solvent into the fluid in a supercritical or critical state, it necessary that the fluid in a supercritical or critical state be miscible with the second solvent and be non-solvating for the non-surface modified nanocellulose particles. The miscibility of the second solvent in the fluid in a supercritical or critical state allows for the second solvent to transfer from the second dispersion into the fluid in a supercritical or critical state, whereas its non-solvating property for the non-surface modified nanocellulose particles prevents the disruption of the native supramolecular structure within the non-surface modified nanocellulose particles.

To achieve the transfer of essentially all of the second solvent into the fluid in a supercritical or critical state in the particle formation vessel, it is necessary that the amount of fluid in a supercritical or critical state that is contacted with the second solvent is sufficiently large so that the second solvent can be essentially fully removed from the second suspension. The exact weight ratio between the fluid in a supercritical or critical state and the second suspension will depend mostly on the chemical nature of the fluid and on the chemical nature of the second solvent used. In the case where the fluid in a supercritical or critical state comprises about 98 to 100 weight percent of carbon dioxide, and the second suspension is a suspension of 0.1 to 10 or preferably 0.1 to 3 weight percent of non-surface modified nanocellulose particles in a C1-C4 alcohols such as for example ethanol, 1-3 parts by weight of second suspension are contacted with 10-10000 parts by weight of fluid in a supercritical or critical state.

By controlling temperature and pressure, most substances that are gaseous at ambient conditions can be set into a state which is different from the common solid, liquid and gas states. In this state, known as the supercritical state, the substances become effective and selective fluid solvents, also called supercritical fluids. A fluid in a supercritical state is defined as a fluid above its critical temperature $T_c$ and critical pressure $P_c$, which parameters together define the critical point in the phase diagram. The critical point represents the highest temperature and pressure at which the substance can exist as a vapour and liquid in equilibrium. The near-critical region can be defined as a region below the critical pressure and/or temperature. Within the near-critical region, some fluids can exist in a state of two phases, with different densities for the vapour and the liquid phase. Even below their critical pressure, i.e. at near-critical conditions, certain compressed gases may attain solvent and penetration properties, which are highly useful in extraction, precipitation, and drying processes.

The fluid in a supercritical or critical state may be chosen from fluids comprising, or consisting of, nitrogen, carbon dioxide, ethane, propane, nitrous oxide, argon, oxygen, methane, butane, n-pentane, nitrous oxide, sulphur hexafluoride, chlorofluorocarbons, fluorocarbons, ethers comprising two alkyl radicals which may be the same or different and which contain no more than 3 carbon atoms, carbon monoxide, helium, hydrogen, xenon, including mixtures of any of these, and are preferably chosen from carbon dioxide, ethane, argon, xenon, air, and nitrogen, and mixtures of any of these. Most preferably, the fluid in a supercritical or critical state is carbon dioxide. The advantage of the above mentioned fluids is that they are gaseous at ambient conditions (e.g. at 25° C. and 1 atm.), and thus can be driven off easily by simply venting the particle formation vessel.

In a one embodiment, the flow of the second suspension of non-surface modified nanocellulose particles can be contacted with the flow of a fluid in a supercritical or critical state by simultaneously atomizing the flow of the second suspension of non-surface modified nanocellulose particles and the flow of the fluid in a supercritical or critical state separately through one or more, preferably concentric or coaxial, nozzles into a pressure- and/or temperature-controlled particle formation vessel, in which the pressure and pressure are set such that the fluid in a supercritical or critical state remains in the supercritical or critical state. Thus, the flow of the second suspension of non-surface modified nanocellulose particles is atomized into the particle formation vessel separately from the flow of the fluid in a supercritical or critical state, i.e. the two flows are contacted only upon simultaneously entering the particle formation vessel through the one or more nozzles.

Useful nozzles for atomising the fluid in a supercritical or critical state and the second suspension of non-surface modified nanocellulose particles are generally known to the skilled person in the field. They include, for example, rotating disk nozzles, impinging jet nozzles, capillary nozzles, single orifice nozzles, ultrasonic nozzles of vibrating or pulsating type, two-fluid nozzles such as concentric or coaxial two-fluid nozzles etc. The nozzles are preferably two-fluid nozzles such as for example concentric or coaxial nozzles.

In an alternative embodiment, the flow of the second suspension of non-surface modified nanocellulose particles can be contacted with the flow of a fluid in a supercritical or critical state by blending, swirling, vortexing or otherwise mixing the flow of the second suspension and the flow of the fluid in a supercritical or critical state to form a first mixture and atomizing said mixture across one or more nozzles, into a pressure- and/or temperature-controlled particle formation vessel, in which the pressure and pressure are set such that the fluid in a supercritical or critical state remains in the supercritical or critical state. Thus, the flow of the second suspension of non-surface modified nanocellulose particles are combined into a mixture already before being atomized into particle formation vessel.

The one or more nozzles lead into the particle formation vessel and may be arranged in different ways, such as for example such that the jets exiting from the one or more nozzles and into the particle formation vessel result in the formation of a vortex or turbulence within the particle formation vessel in order to enhance the transfer of the second solvent towards the fluid in a supercritical or critical state.

Once the second suspension of non-surface modified nanocellulose particles is contacted with the supercritical fluid at the particle formation vessel, the partial or entire taking up of the second solvent into the fluid in a supercritical or critical state initiates the formation of the non-surface modified nanocellulose particles and the settling of said particles at the bottom of the particle formation vessel. The mixture of second solvent and fluid is removed from the particle formation vessel in order to subsequently collect the dry, water-dispersible nanocellulose particles.

Removal of the mixture of fluid in a supercritical or critical state and second solvent may preferably be achieved by controlling pressure and/or temperature, such as for example flushing, venting or evacuating the particle formation vessel or by redirecting the mixture into a gas separation device capable of separating the mixture into the separate components making up the mixture or at least to reclaim one of second solvent or fluid, while optionally heating the vessel at the same time. Optionally, the vessel may be purged several times with another gas to remove residual second solvent or fluid, or repeatedly heated to drive off residual second solvent or fluid.

Once the removal of the mixture of fluid in a supercritical or critical state and second solvent is completed, dry, water-dispersible nanocellulose particles are formed, and which are subsequently isolated from the particle formation vessel.

The particle formation vessel can be any vessel for which the temperature and pressure may be controlled, and which comprises of an opening from which the non-surface modified nanocellulose particles can be removed in order to collect the dry, water-dispersible, non-surface modified nanocellulose particles.

The dry, water-dispersible, non-surface modified nanocellulose particles can be dispersed in water to yield a suspension of non-surface modified nanocellulose particles which is identical in microscopic morphology and rheology to the suspension of non-surface modified nanocellulose particles from which it has been manufactured from.

The thus obtained dry, water-dispersible, non-surface modified nanocellulose particles are a free-flowing powder that can be stored, transported and metered easily. An advantage of spray-drying with a fluid in supercritical or critical state is that the particle size is narrowly distributed.

EXAMPLES

Preparation of a CNF Suspension

Bleached sulphite dissolving hardwood pulp (92a) was knife milled and soaked in 78% morpholine:water mixture at 1% (w/w) concentration for one hour at ambient temperature. The thus obtained suspension of swollen, non-surface modified cellulose particles was then subjected to high shear mechanical comminution using a MICROFLUIDICS® M-110EH high shear fluid processor set to 1 700 bar for five consecutive passes.

The thus obtained suspension of non-surface modified cellulose in morpholine:water mixture was then mildly centrifuged to separate the cellulose nanofibrils from the morpholine:water mixture, taking however care not to completely dry the cellulose nanofibrils. The remaining morpholine:water mixture was then removed by repeatedly washing the moist cellulose nanofibrils with deionised water, and then removing the water by first mildly centrifuging and then repeatedly washing the moist cellulose nanofibrils with ethanol using centrifugation. Ethanol was then added such as to obtain a suspension of non-surface modified cellulose nanofibrils in ethanol having a non-surface modified cellulose nanofibrils content of 1.3 weight percent.

Drying

The previously obtained 1.3 wt % suspension of non-surface modified cellulose nanofibrils in ethanol was adjusted to yield a 2 wt % suspension of non-surface modified cellulose nanofibrils in ethanol. The thus obtained suspension was them flown in to the particle formation vessel at a mass flow rate of 100 ml/min and contacted with supercritical CO2 flown into the particle formation vessel at a mass flow rate 15 kg/h, at a pressure of 120 bar and a temperature of 40° C. The powdery cellulose material that accumulated at the bottom of the particle formation vessel was when isolated for further characterization.

Structure

In order to evaluate the morphology of the non-surface modified cellulose nanofibrils before and after spray-drying with supercritical carbon dioxide, a sample of the never-dried non-surface modified cellulose nanofibrils of 1.0 weight percent non-surface modified cellulose nanofibrils in ethanol was washed in deionized water to remove the ethanol and diluted 100× in water, then homogenised using a sonication probe (GEX 130, ultrasonic processor, 130 W, Cole-Parker, UK) for 3 minutes at 60% intensity, followed by another 10× dilution using deionised water, forming the a suspension having 0.001 weight percent of non-surface modified cellulose nanofibrils.

Likewise, dry, non-surface modified nanocellulose particles obtained through spray-drying using supercritical carbon dioxide were dispersed in deionized water to yield a suspension of 1.0 weight percent non-surface modified cellulose nanofibrils in deionized water, and then diluted 100× in water, homogenised using a sonication probe (GEX 130, ultrasonic processor, 130 W, Cole-Parmer, UK) for 3 minutes at 60% intensity, followed by another 10× dilution using deionised water, forming the a suspension having 0.001 weight percent of non-surface modified cellulose nanofibrils.

Each of the samples was dropped on a fresh cleaved mica disc (muscovite, 9.9 mm diameter and 0.22-0.27 mm thickness, Agar Scientific, UK) that was attached on a SEM aluminium stub. Subsequently, the samples were dried in a vacuum oven (Gallenkamp) at 35° C. and 700 mbar in vacuum overnight.

The dried samples were gold coated for 50 seconds using a sputter coater (EMITECH K550X, Quorumtech, UK) in order to provide adequate conductivity and were observed using a SEM (S4800 field emission SEM, Hitachi, UK). 3 kV and 8.5 mm were used as the acceleration voltage and observation distance, respectively.

Figure 2:
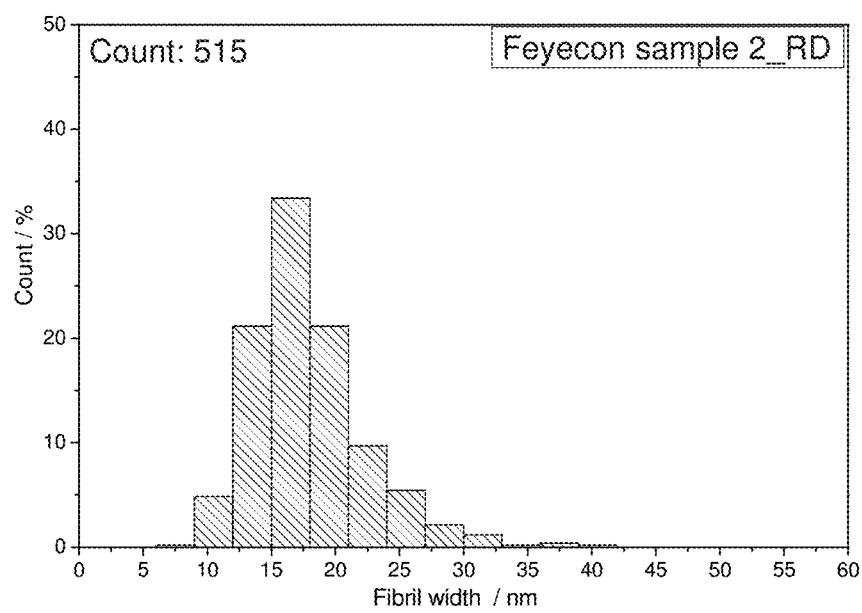
FIG. 2 shows the fibril width distribution of the dried, non-surface modified nanofibrillar cellulose obtained according to the present invention using the non-surface modified, never-dried nanofibrillar cellulose analysed for FIG. 1, as measured by image analysis of SEM micrographs

The width of fibrils in micrographs of 45 k magnification was measured using ImageJ software (version 1.47, National Institutes of Health, USA). More than 500 fibrils were measured in various images. The fibril width distribution for all samples is shown in histograms shown in FIGS. 1 and 2.

Rheology

Samples of both the never-dried and dried nanocellulose were dispersed in water at three different concentrations, i.e. 3.18%, 2.55% and 1.92% (w/w) according to the method described above. These samples were tested on a controlled-stress rheometer AR-1500ex (TA Instruments) using a concentric cylinder geometry with 1 mm measurement gap at 20° C.

Figure 3:
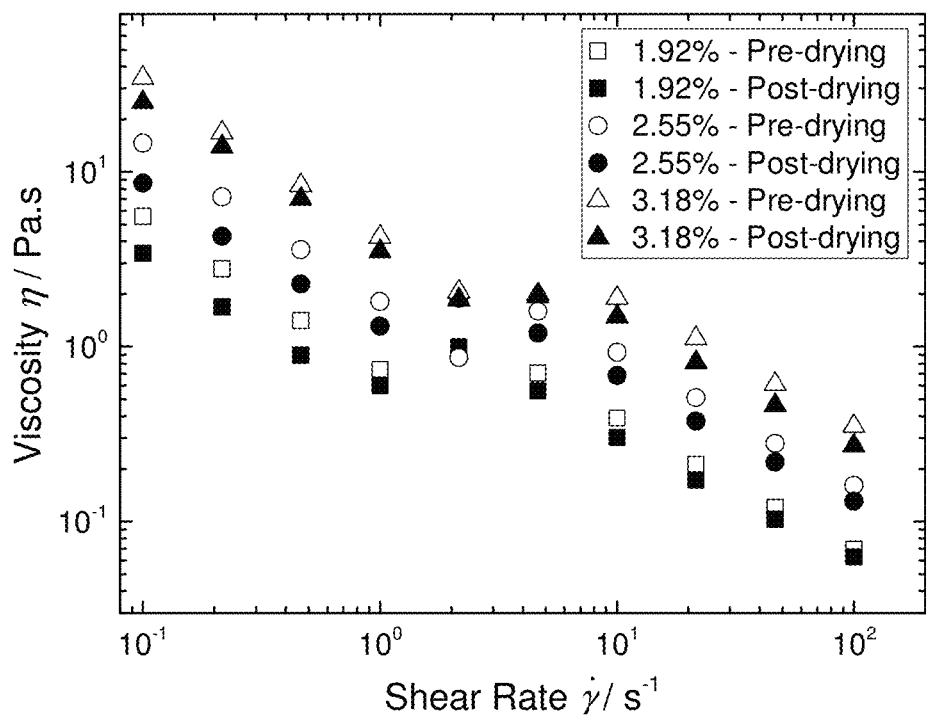
FIG. 3 shows the viscosity of dispersions of non-modified, never-dried nanofibrillar cellulose nanofibrillar and non-surface modified cellulose obtained according to the present invention using the non-modified, never-dried nanofibrillar cellulose at different concentrations of 1.92, 2.55 and 3.18 weight percent, depending on the shear rate.
Figure 4:
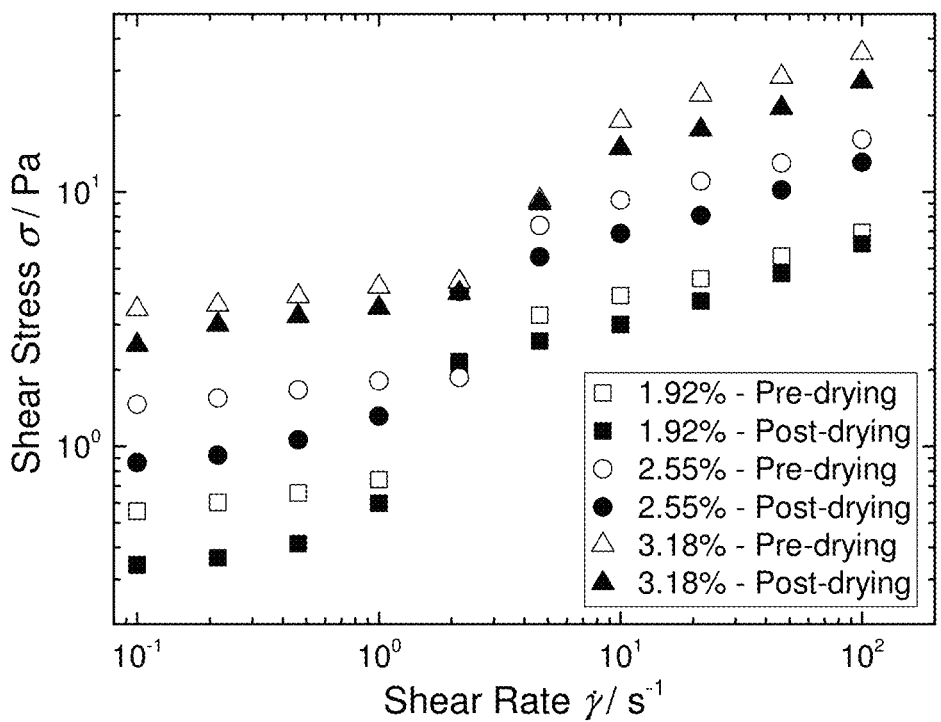
FIG. 4 shows the shear stress of dispersions of non-modified, never-dried nanofibrillar cellulose nanofibrillar and non-surface modified cellulose obtained according to the present invention using the non-modified, never-dried nanofibrillar cellulose at different concentrations of 1.92, 2.55 and 3.18 weight percent, depending on the shear rate.

All samples were first subjected to 50 $s^{-1}$ of shear rate for 60 s. Then the recovery of their G' and G" (elastic and viscous moduli respectively) was measured as a function of time for 1800 s at 0.1% oscillatory strain and 50 rad s$^{-1}$ angular frequency. Results are shown in FIGS. 3 and 4. As can be seen from the results presented in the Figures, the viscosity of the never-dried sample is essentially re-established for the dried sample upon re-dispersion at all concentrations studied.

Figure 5:
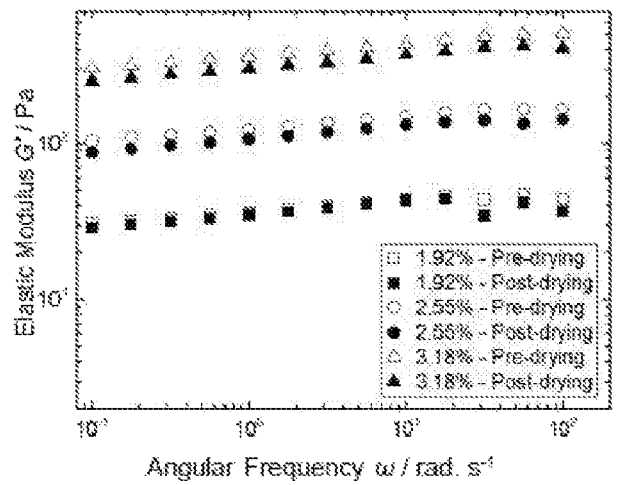
FIG. 5 shows the elastic modulus (G') of dispersions of non-modified, never-dried nanofibrillar cellulose nanofibrillar and non-surface modified cellulose obtained according to the present invention using the non-modified, never-dried nanofibrillar cellulose at different concentrations of 1.92, 2.55 and 3.18 weight percent, depending on the angular frequency.
Figure 6:
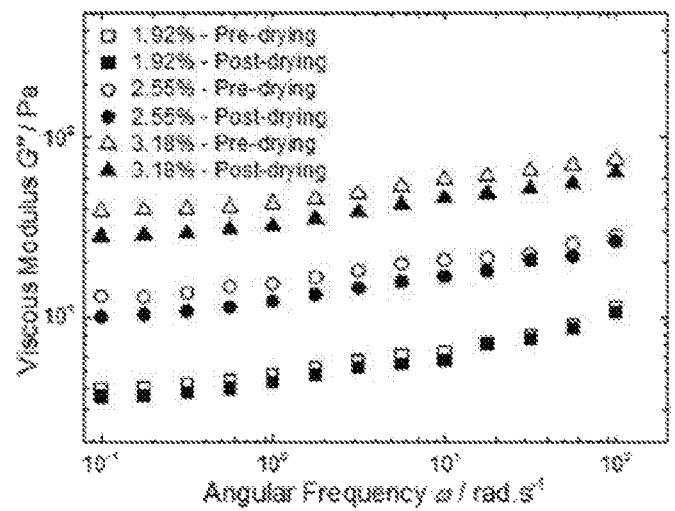
FIG. 6 shows the viscous modulus (G") of dispersions of non-modified, never-dried nanofibrillar cellulose nanofibrillar and non-surface modified cellulose obtained according to the present invention using the non-modified, never-dried nanofibrillar cellulose at different concentrations of 1.92, 2.55 and 3.18 weight percent, depending on the angular frequency.
Figure 7:
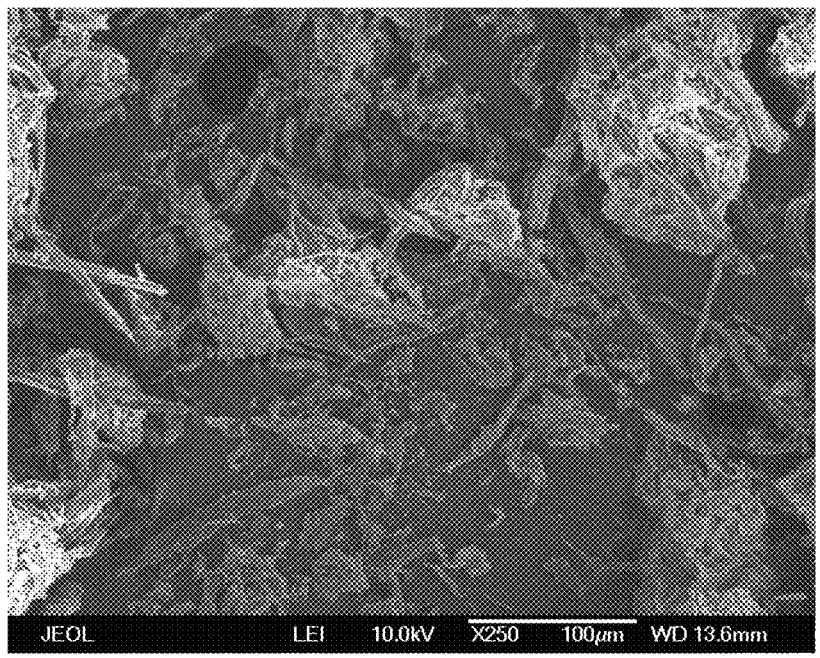
FIG. 7 shows an SEM micrograph of dry CNF obtained from a 2 wt % CNF hexanol dispersion that was spray-dried using supercritical $CO_2$
Figure 8:
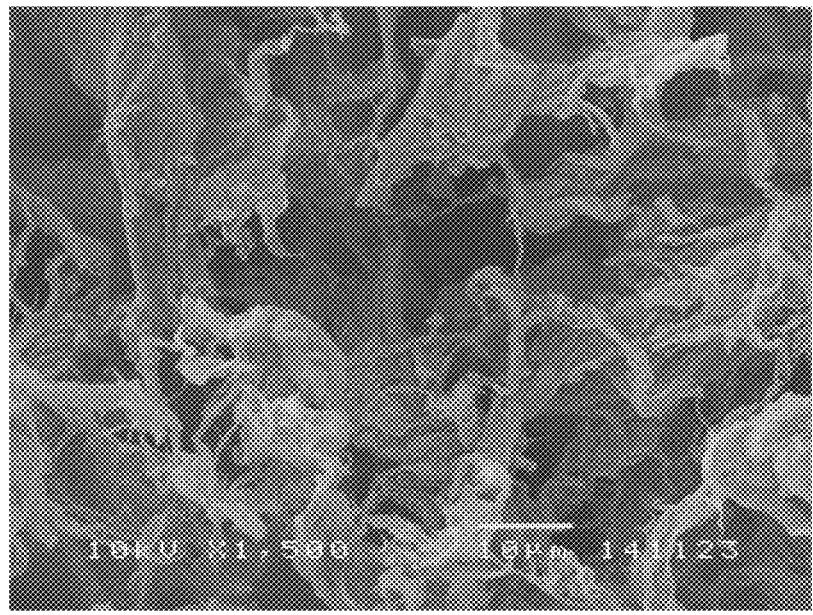
FIG. 8 shows an SEM micrograph of dry CNF obtained from a 2 wt % CNF ethanol dispersion that was spray-dried using supercritical $CO_2$

After the recovery period, the dispersions were analyzed in a frequency sweep. The angular frequency was varied from 0.1 to 300 rad s$^{-1}$ logarithmically (4 data points per decade) at 0.1% oscillatory strain and G'/G" were recorded. At the end, a decelerating 'steady-state' shear rate sweep was performed between 100 and 0.1 s$^{-1}$ of shear rates. The steady state was defined as less than 5% variation in the viscosity value over three consecutive measurement periods of 30 s each. The maximum time allowed for each data point was 240 s. The shear rate/viscosity values were recorded at all shear rates. Results are shown in FIGS. 5 and 6. The oscillatory frequency sweep measurements show that, similarly to viscosity measurements above, both G' and G" have been significantly recovered following re-dispersion of dried product sample at all three concentrations studied.

In order to provide a quantification of the recovery of viscosity and G'/G" following re-dispersion, representative values for each of the curves in FIGS. 3, 4, 5 and 6 have been compared in Table 1 below. From the data it becomes apparent that the rheological parameters such as viscosity show about 75% to about 80% recovery following re-dispersion and G'/G" recovery is about 80% and above.

TABLE 1

Representative rheological parameters at all three concentrations.

| Concentration (w/w)/% | Viscosity η at 10 s−1/Pa·s | | G' at 10 rad·s−1/Pa | | G" at 10 rad·s−1/Pa | |
|---|---|---|---|---|---|---|
| | Never dried | Dried | Never dried | Dried | Never dried | Dried |
| 1.92 | 0.391 | 0.301 | 44.3 | 43.2 | 6.36 | 5.78 |
| 2.55 | 0.908 | 0.695 | 148 | 131 | 20.7 | 16.8 |
| 3.18 | 1.89 | 1.48 | 430 | 366 | 58.1 | 46.2 |

The invention claimed is:

1. A process for producing dry, water dispersible, non-surface modified nanocellulose particles or a powderous composition comprising said particles comprising the steps of:
   i. providing a first suspension of non-surface modified cellulose particles in a first aqueous liquid, wherein the first aqueous liquid is non-solubilising for the non-surface modified cellulose particles and processing the first suspension of non-surface modified cellulose particles in the first aqueous liquid to form a first suspension of non-surface modified nanocellulose articles in the first aqueous liquid,
   ii. exchanging the first aqueous liquid of the first suspension of non-surface modified nanocellulose particles for a second solvent which is miscible with the first aqueous liquid of the first suspension of non-surface modified nanocellulose particles and non-solubilising for the non-surface modified nanocellulose particles to form a second suspension of non-surface modified nanocellulose particles in said second solvent,
   iii. contacting a flow of the second suspension of non-surface modified nanocellulose particles with a flow of a fluid in a supercritical or critical slate, wherein the fluid in a supercritical or critical state is miscible with the second solvent and non-solvating for the non-surface modified nanocellulose particles under conditions suitable for the transfer of the second solvent into the supercritical fluid,
   iv. removing the second solvent and the fluid in a supercritical or critical state to form the dry, water dispersible, non-surface modified nanocellulose particles, and
   v. collecting the dry, water dispersible, non-surface modified nanocellulose particles and/or forming a powderous composition comprising said particles.

2. The process according to claim 1, wherein the first aqueous liquid is either water or a mixture of water and one or more organic solvents capable of acting as swelling agents.

3. The process according to claim 1, wherein the first suspension of non-surface modified cellulose particles comprises up to 20 wt % of the non-surface modified cellulose particles.

4. The process according to claim 1, wherein in the step of contacting the flow of the second suspension of non-surface modified nanocellulose particles with the flow of the fluid in a supercritical or critical state, the mass flow ratio between the second suspension and the fluid in a supercritical or critical state is in the range of 1:10000 to 3:10.

5. The process according to claim 1, wherein in step iii, the second suspension and the fluid in a supercritical or critical state are contacted either;
   vi. by simultaneously atomizing the flow of the second suspension of non-surface modified nanocellulose particles and the flow of the fluid in a supercritical or critical state separately through one or more nozzles into a pressure-controlled and/or temperature-controlled particle formation vessel, or
   vii. by blending, swirling, vortexing or mixing the flow of the second suspension and the flow of the fluid in a supercritical or critical state to form a mixture and atomizing said mixture through one or more nozzles into a pressure controlled- and/or temperature-controlled particle formation vessel.

6. The process according to claim 1, wherein in step the second suspension and the fluid in a supercritical or critical state are contacted by simultaneously atomizing the flow of the second suspension of non-surface modified nanocellulose particles and the flow of the fluid in a supercritical or critical state separately through one or more concentric or coaxial nozzles into a pressure-controlled and/or temperature-controlled particle formation vessel, the second suspension being flowed through a central jet of the concentric or coaxial nozzle and the fluid in a supercritical or critical state being flowed through an annular peripheral jet of the concentric or coaxial nozzle.

7. The process according to claim 1, wherein the second solvent is chosen from organic solvents.

8. The process according to claim 1, wherein the fluid in a supercritical or critical state is a fluid comprising carbon dioxide.

9. The process according to claim 1, wherein in step iv., the second solvent and the fluid in a supercritical or critical state are removed by controlling pressure and/or temperature.

10. The process according to claim 1, wherein the first aqueous liquid is a mixture of water and a cyclic secondary amine comprising of from 60 to 99% by volume of cyclic amine.

11. The process according to claim 1, wherein the first aqueous liquid is a mixture of water and morpholine, piperidine or both.

12. The process according to claim 1, wherein the first aqueous liquid is a mixture of water and morpholine, piperidine or both comprising of from 60 to 99% by volume of morpholine, piperidine or both.

13. The process according to claim 1, wherein the first aqueous liquid is a mixture of water and morpholine, piperidine or both comprising of from 70 to 95% by volume of morpholine or piperidine or both.

14. The process according to claim 1, wherein the first suspension of non-surface modified cellulose particles comprises from 0.1 to 20 wt % of the non-surface modified cellulose particles.

15. The process according to claim 1, wherein the first suspension of non-surface modified cellulose particles comprises more than 2 wt % and less than 20 wt % of the non-surface modified cellulose particles.

16. The process according to claim 1, wherein in the step of contacting the flow of the second suspension of non-surface modified nanocellulose particles with the flow of the fluid in a supercritical or critical state, the mass flow ratio between the second suspension and the fluid in a supercritical or critical state is in the range of 3:10000 to 3:10.

17. The process according to claim 1, wherein the second solvent is chosen from polar solvents chosen from alcohols, aldehydes, or ketones.

18. The process according to claim 1, wherein the second solvent is chosen from chosen from C1-C4 alcohols or from C1-C4 ketones.

19. The process according to claim 1, wherein the second solvent is chosen from ethanol, isopropanol or acetone.

20. The process according to claim 1, wherein the fluid in a supercritical or critical state is carbon dioxide.

* * * * *